Feb. 27, 1968 W. J. VNUK 3,370,580
SPEED CONTROL FOR AN AUTOMOTIVE VEHICLE
Filed Sept. 16, 1966 3 Sheets-Sheet 3
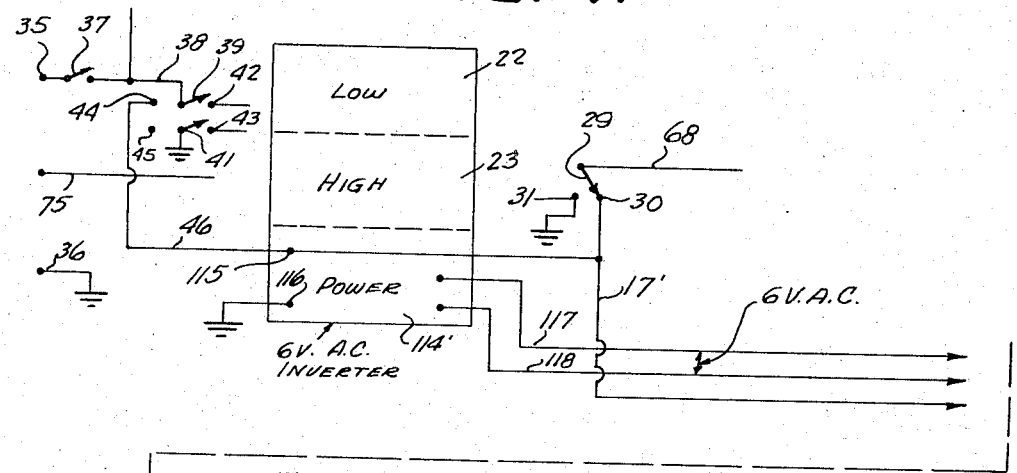
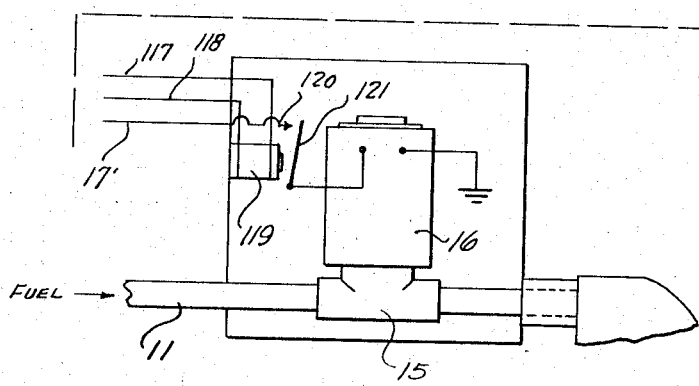
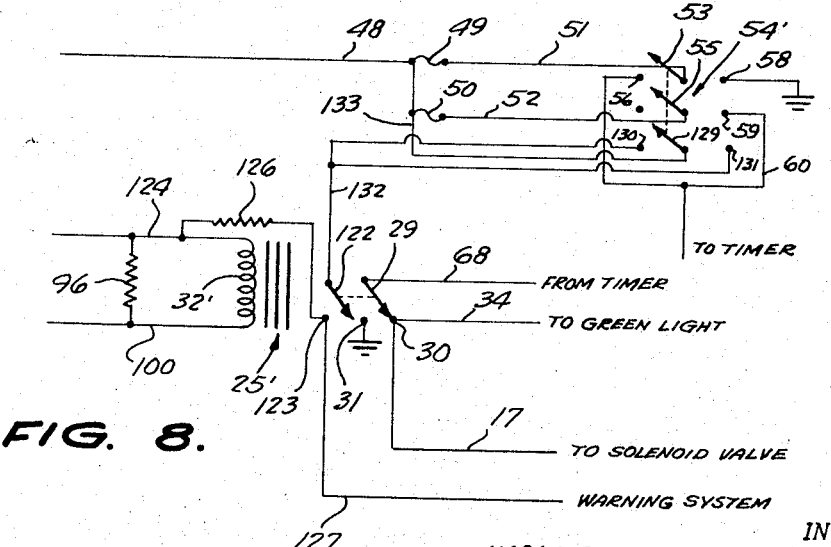
INVENTOR.
WALLACE J. VNUK,
BY
Berman, Davidson & Berman
ATTORNEYS.

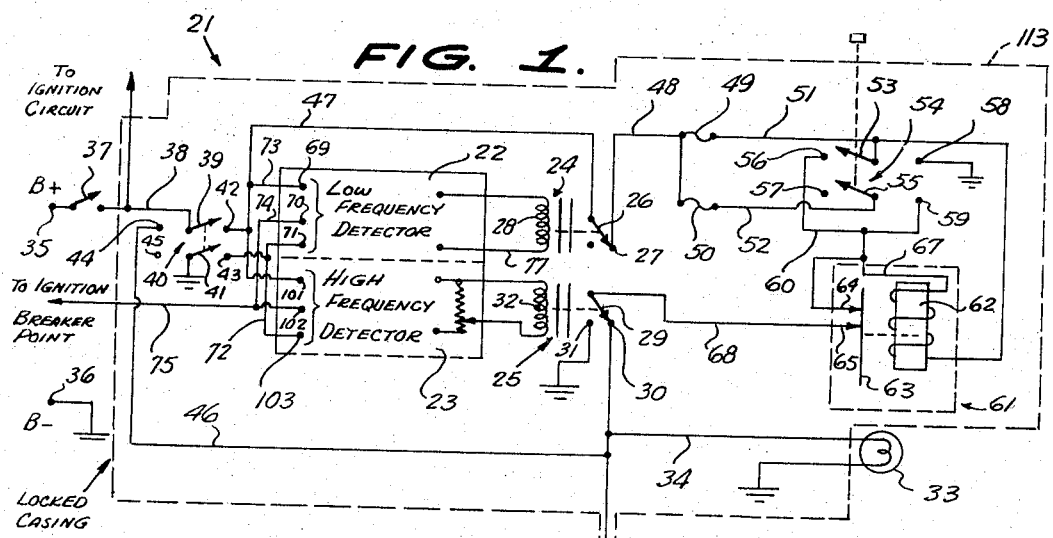
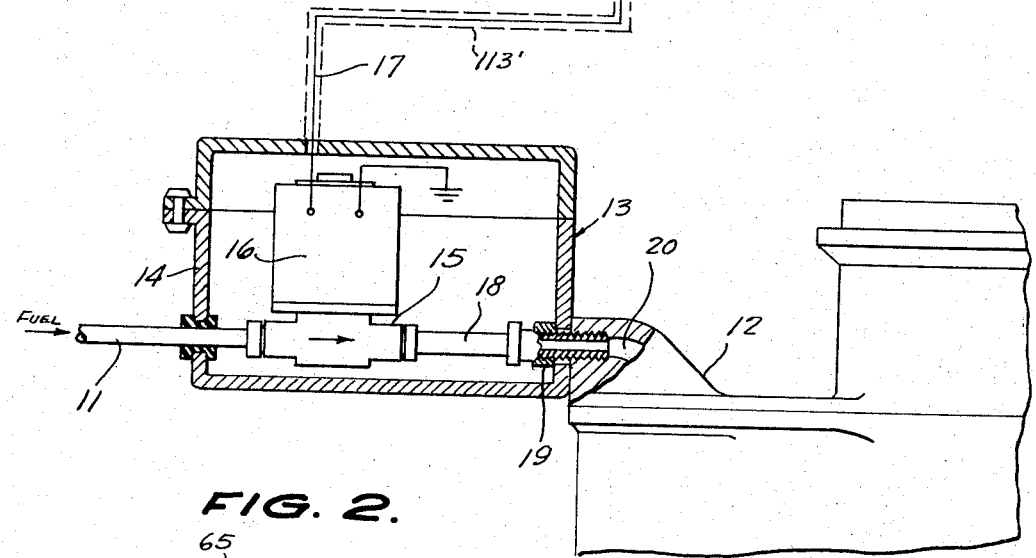
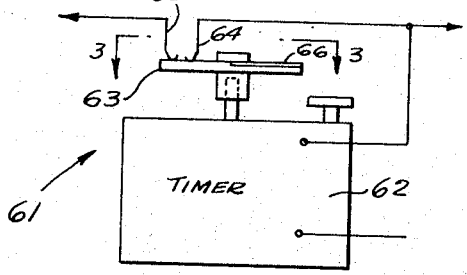

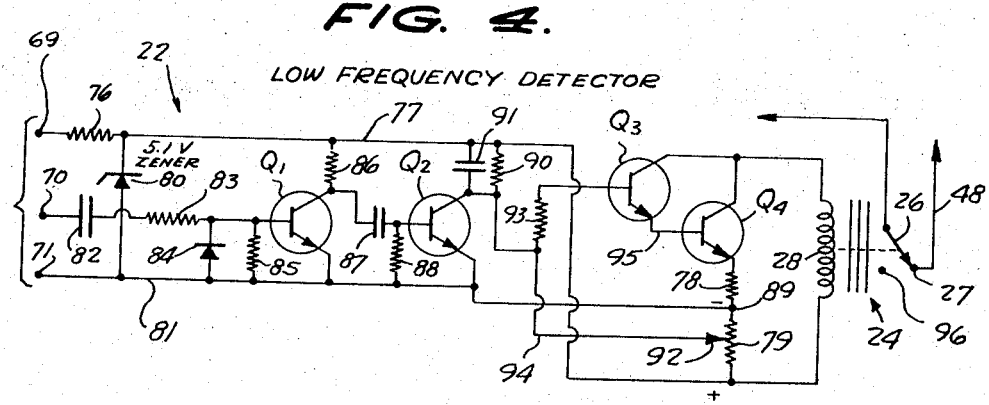
FIG. 4. LOW FREQUENCY DETECTOR
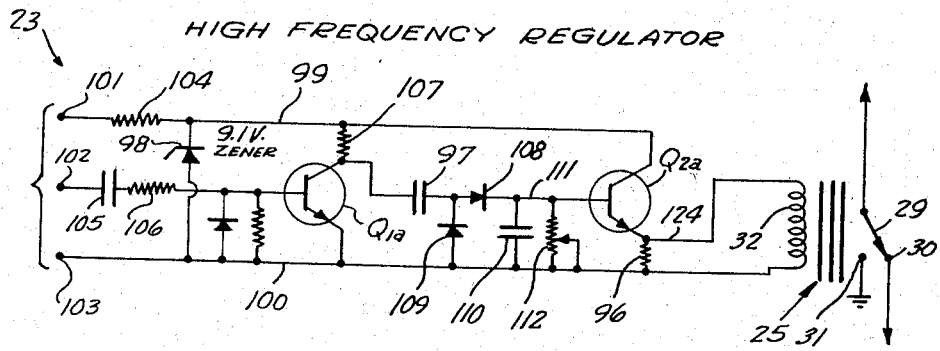
FIG. 5. HIGH FREQUENCY REGULATOR
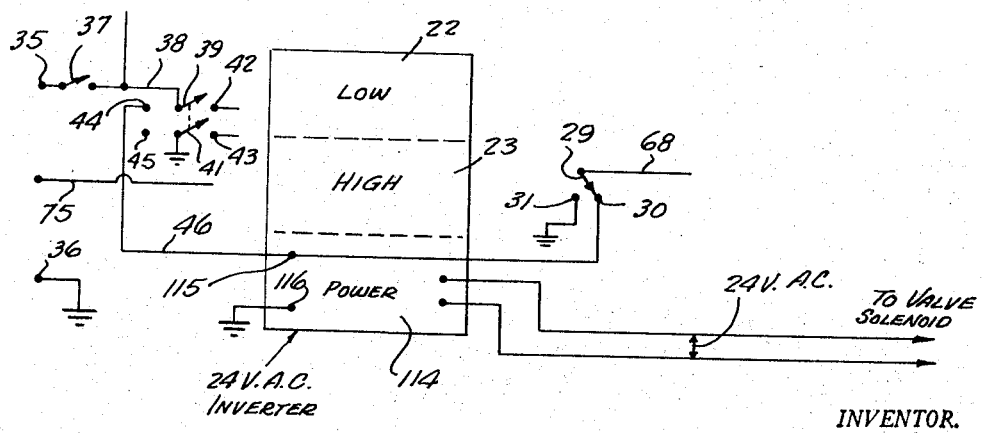
FIG. 6.

United States Patent Office 3,370,580
Patented Feb. 27, 1968

3,370,580
SPEED CONTROL FOR AN AUTOMOTIVE VEHICLE
Wallace J. Vnuk, 3773 E. Gill Drive, Denver, Colo. 80209
Filed Sept. 16, 1966, Ser. No. 579,859
10 Claims. (Cl. 123—198)

This invention relates to speed-governing devices for vehicles, and more particularly to an apparatus for automatically controlling the speed of an automobile or similar motor vehicle to limit or prevent reckless and high-speed operation of the vehicle.

A main object of the invention is to provide a novel and improved speed-control apparatus for use in an automotive vehicle to prevent reckless and high-speed driving of the vehicle, but to permit normal operation of said vehicle up to certain optional limits and to permit proper and careful operation of the vehicle, the apparatus involving simple components, being easy to install, and being substantially tamperproof.

A further object of the invention is to provide an improved electronic speed-control device for use on an automotive vehicle to prevent reckless and high-speed driving of the vehicle, but to permit normal operation thereof, the apparatus being relatively compact in size, employing relatively inexpensive components, using a minimum amount of power consumption, and serving as a deterrent to reckless and high-speed driving, for example, serving to discourage inexperienced or irresponsible persons from driving at excessive speeds or in a reckless manner.

A still further object of the invention is to provide an improved automatic speed-controlling apparatus for use on an automobile or other motor vehicle to curb reckless and high-speed driving, the device employing compact solid-state electronic circuit elements which are reliable in operation and which are inexpensive to manufacture, the internal circuitry and mechanical features of installation being such that any tampering or wire switching causes the device to "fail safe," namely, to interrupt the fuel supply of the associated vehicle, the apparatus being mounted in a manner which tends to discourage tampering and internal derangement by even relatively ingenious mechanics.

Further objects and advantages of the invention will become apparent from the following description and claims, and from the accompanying drawings, wherein:

FIGURE 1 is an electrical circuit diagram illustrating one form of automatic vehicle speed-control device constructed in accordance with the present invention.

FIGURE 2 is a diagrammatic side elevational view of the timed switch device employed in FIGURE 1, showing the circuit connections thereto.

FIGURE 3 is a fragmentary top plan view taken on the line 3—3 of FIGURE 1, showing the contact disc and cooperating brushes of the timed switch device.

FIGURE 4 is a circuit diagram of a transistorized low frequency-detection circuit which may be employed in the apparatus of FIGURE 1.

FIGURE 5 is an electric circuit diagram of a transistorized high frequency-detection and regulating circuit which may be employed in the apparatus of FIGURE 1.

FIGURE 6 is a partial schematic wiring diagram showing a modification of the circuit of FIGURE 1.

FIGURE 7 is a partial wiring diagram showing another possible modification of the circuit of FIGURE 1.

FIGURE 8 is a partial wiring diagram showing a still further modification of the circuit of FIGURE 1.

The apparatus of the present invention functions by virtue of the fact that the frequency of the pulses from the distributor points of a motor vehicle is proportional to the r.p.m. of the vehicle engine, and also, that the speed of the vehicle, once the forces of inertia have been overcome, even with an automatic transmission, is in direct proportion to the r.p.m. of the engine.

A prime purpose of the present invention is to provide a system for controlling the speed of a vehicle in a manner such that when the vehicle exceeds a predetermined safe limiting speed, for example, a speed corresponding to a posted speed limit such as 40 m.p.h., or a speed slightly above the posted speed limit, a valve controlling the supply of fuel to the vehicle engine will close, and simultaneously a signal will be given which will warn the operator. This will enable the operator to actuate a switch provided externally of the apparatus which activates a timer device so as to provide an additional supply of fuel, for example, for a period of the order of 30 minutes, which will enable the operator to return home or to drive to a convenient location to obtain assistance. During this grace period of 30 minutes, or the like, if the operator again exceeds the predetermined limiting speed, the fuel supply will be again interrupted, while the timing device continues to run and eventually turns itself off. It is also intended, within the spirit of the present invention, to provide suitably supervised means to, at times, render the control apparatus inoperative, for example, when high speed highway travel is anticipated, and to provide appropriate access to reset means for the timed switch device above-mentioned. From the above discussion, it will be obvious that the apparatus is intended to operate in a manner such that if after a driver has obtained a warning which notifies him that he has approximately only 30 minutes or the like of further driving capability of the vehicle, the person will be influenced to exert proper care in driving during this grace period so as to avoid the embarrassment and inconvenience of the vehicle becoming completely inoperative. The invention is further characterized by the provision of a sufficient short-time lag after the fuel valve closes to enable the associated engine to run for a reasonable period of time on the order of 30 seconds to take care of occasional emergency situations, such as those which may arise driving in traffic when it becomes necessary to accelerate quickly to avoid a collision with another vehicle which may be out of control, or a similar emergency, or to find a suitable place to park, Referring to the drawings, and more particularly to FIGURE 1, 11 designates the fuel line of a motor vehicle leading to the carbureator 12 thereof, and 13 generally designates a control-valve assembly connected in the fuel line 11 ahead of the carburetor 12. The control-valve assembly 13 comprises a housing 14 which is sealed and which contains a solenoid valve 15 connected in the fuel line, as shown, the valve being normally closed, but being held open when its solenoid 16 is energized. As shown in FIGURE 1, one terminal of the solenoid 16 is grounded and the other terminal is connected to a wire 17 leading to the electrical circuit portion of the apparatus. As shown in FIGURE 1, the solenoid valve 15 is provided with the outlet conduit portion 18 leading to an internally-housed conduit connector 19 which is, in turn, connected to the fuel inlet passage 20 of the carburetor 12. The conduit elements 18, 19 and the passage 20 are of sufficient length so that when valve 15 is closed there will be a residual amount of fuel available at feed pressure to allow the associated engine to run for a short time without stalling, for example, for a time period of the order of 30 seconds.

The electrical control-circuit portion of the apparatus is designated generally at 21. The apparatus 21 comprises a "low frequency-detector" portion 22 and a "high frequency-detector" portion 23 and associated respective relays 24 and 25. The relay 24 has a pole 26 which normally engages a stationary contact 27, but which disengages therefrom responsive to the energization of the winding 28 of the relay. Similarly, the relay 25 has a pole 29 which normally engages a first stationary contact 30, but which is moved into engagement with a second stationary contact 31 responsive to the energization of the winding 32 of the relay. The winding 32 is energized from the output of the high frequency-detector section 23 in a manner presently to be described. The wire 17 is connected to the stationary contact 30, and the remaining stationary contact 31 of relay 25 is grounded, as shown.

A suitable indicating lamp 33, for example, a green lamp, has one terminal thereof grounded, and the other terminal thereof connected by a wire 34 to the wire 17. Under normal conditions the lamp 33 is energized, along with solenoid 16, since said lamp is connected in parallel with said solenoid.

In the circuit arrangement of FIGURE 1, 35 designates the ungrounded terminal of the vehicle battery and 36 designates the grounded terminal of said battery. The ignition switch of the vehicle is designated at 37, and it will be seen that the ungrounded positive terminal 35 of the vehicle battery is connected through the ignition switch 37 to a wire 38, which is, in turn, connected to one pole 39 of a double-pole, double-throw switch designated generally at 40. The other pole 41 of switch 40 is grounded, as shown.

In one closed position of switch 40, the poles 39 and 41 are respectively engageable with stationary contacts 42 and 43, whereas, in the opposite closed position of the switch, said poles are engageable with stationary contacts 44 and 45. Contact 44 is connected by a wire 46 to the wire 17, so that in said opposite closed position of switch 40, the wire 17 is connected directly to the ignition wire 38 so that solenoid 16 is held energized as long as ignition switch 37 is closed. As will be presently explained, this setting eliminates the automatic speed control of the apparatus and is employed when high speed highway travel is anticipated.

The stationary contact switch 42 is connected to a wire 47, which, in turn, is connected to the relay pole 26. Relay contact 27 is connected to a wire 48, which is connected through respective fuses 49 and 50 to branch wires 51 and 52. Wire 51 is connected to one pole 53 of a manually-operated double-pole double-throw switch 54, and wire 52 is connected to the remaining pole 55 of switch 54. In a first closed position of switch 54, the poles 53 and 55 are respectively engageable with stationary contacts 56 and 57, whereas, in a second closed position of switch 54 the poles 53 and 55 are engageable with additional respective stationary contacts 58 and 59. Contact 56 is connected to contact 59 by a wire 60. Contact 58 is grounded, as shown.

Designated generally at 61 is a timed switch device comprising a driving motor portion 62 which is drivingly-coupled to a contact disc 63 engaged by a pair of spaced contact brushes 64 and 65. The disc 63 is made of metal, but is provided with a semicircular top portion 66 of insulating material, such as plastic, or the like. As shown in FIGURE 3, the brushes 64 and 65 normally engage the metallic main body portion of the disc 63 and are electrically-bridged thereby. FIGURE 3 shows the disc 63 in its normal starting position. After a predetermined period of energization of the driving portion 62 of the timer, insulator 66 moves beneath one of the brushes and breaks the circuit therebetween. The period of time required to open the circuit between brushes 64 and 65 in the manner described above may be of any desired value, for example, 30 minutes, or the like.

As shown in FIGURE 1, the wire 51 is connected to one terminal of the motor device 62 of the timer 61, and the other terminal of said motor device 62 is connected by a wire 67 to the wire 60. Brush 64 is connected to wire 67 and brush 65 is connected to the relay pole 29 by a wire 68. As will be presently explained, the device 62 may be energized (with fuse 49 blown) by a circuit which is completed when switch pole 53 is moved into engagement with contact 58 to thereby connect one terminal of the timing motor device 62 to ground, and the other terminal to the ungrounded battery wire 38 through switch pole 55 and contact 59, wire 52, fuse 50, wire 48, relay contacts 26, 27, wire 47, and switch contacts 42–39.

Referring to FIGURE 4, it will be seen that the low frequency-detector device 22 has three input terminals shown at 69, 70 and 71. Terminal 71 is connected to a wire 72, which is, in turn, connected to the stationary switch contact 43, engageable by switch pole 41, whereby to connect wire 72 to ground. Terminal 69 is connected by a wire 73 to the ungrounded battery supply wire 47, connected to the battery wire 38 through contacts 39, 42 when switch 40 is closed in a direction to cause poles 39 and 41 to engage stationary contacts 42 and 43, respectively. Terminal 70 is connected by a wire 74 to an ignition pulse-detection wire 75 connected to the ungrounded side of the vehicle distributor points, whereby the pulse signal applied to the wire 75 has a frequency in accordance with the speed of the vehicle engine.

Battery terminal 69 is connected through a resistor 76 to a wire 77 leading to one terminal of relay winding 28. The other terminal of the relay winding 28 is connected to the collectors of a pair of transistor $Q_3$ and $Q_4$, the emitter of the transistor $Q_3$ being connected to the base of the transistor $Q_4$ and the emitter of the transistor $Q_4$ being connected to the wire 77 through a resistor 78 and the winding of a potentiometer 79. A Zener diode 80 is connected between wire 77 and a ground wire 81, connected to terminal 71, to limit the supply voltage to a predetermined value, for example, to a value of 5.1 volts. Pulse input terminal 70 is connected to the base of a transistor $Q_1$ through a blocking condenser 82 and a resistor 83. The condenser 82 blocks the direct current flow from the distributor points, but allows the pulses to pass.

The collector of transistor $Q_1$ is connected to the ungrounded supply voltage wire 77 by a resistor 86. The collector of transistor $Q_1$ is connected to the base of a second transistor $Q_2$ through a condenser 87. A resistor 88 is connected between the base of transistor $Q_2$ and the ground wire 81. The emitters of transistors $Q_1$ and $Q_2$ are both connected to the ground wire 81, which is, in turn, connected to the junction 89 of resistor 78 and potentiometer winding 79.

The collector of transistor $Q_2$ is connected to the positive supply wire 77 through a resistor 90. A condenser 91 is connected across resistor 90. The condenser 91 and the resistor 90 serve as a smoothing filter to smooth out the current reaching relay winding 28 so as to substantially prevent chatter in the relay 24 at low frequencies.

The base of the transistor $Q_3$ is connected to the sliding contact 92 engaging the potentiometer winding 79 through a resistor 93 and a wire 94. The collector of the transistor $Q_2$ is conected to said wire 94. As shown in FIGURE 4, the emitter of transistor $Q_3$ is connected by a wire 95 to the base of a transistor $Q_4$.

As above-mentioned, the condenser 82 blocks the direct current from the distributor points, but allows the pulses to pass. The resistor 83 and the silicon diode 84 limit the pulse peaks to approximately 0.5 volt. Resistor 76 and Zener diode 80 limit the supply voltage to approximately 5.1 volts. Resistor 85 and resistor 88 serve to keep transistors $Q_1$ and $Q_2$ turned off in the absence of pulses. The collector of transistor $Q_1$ remains at a potential equal substantially to the supply voltage until a pulse arrives and then drops to almost zero. This change is passed through condenser 87, which differentiates the level changes into alternate spikes. Only a positive-going spike will turn transistor $Q_2$ on. When transistor $Q_2$ is turned on, current is passed to wire 94, and thus, to the adjustable slider 92.

With switch poles 39 and 41 engaging contacts 42 and 43 and with ignition switch 37 open, the relay 24 is in the position shown in FIGURES 1 and 4, namely, with pole 26 engaging stationary contact 27. With the ignition switch 37 closed, the potentiometer 92–79 provides forward bias through resistor 93 to the bases of transistors $Q_3$ and $Q_4$ sufficient to cause energization of relay winding 28 and to disengage pole 26 from contact 27 and move it toward the blank stationary contact shown at 96. During the cranking phase of starting the engine and thereafter, the current from the collector of transistor $Q_2$ is in accordance with and is controlled by the pulses applied to the input terminal 70. This collector current changes the bias on the bases of transistors $Q_3$ and $Q_4$, turning them off and allowing relay 24 to return to its normal position, namely, with pole 26 engaging contact 27. as shown in FIGURE 4.

The circuit of FIGURE 4 is not affected by the frequency of the pulses from transistor $Q_2$. With increased frequency, the transistors $Q_3$ and $Q_4$ are merely turned off to a more intense degree. The potentiometer 92–79 is used to adjust the bias on the base of transistor $Q_3$ for optimum control of the current in relay winding 28 and to eliminate chatter in the relay 24 at low frequencies.

As shown in FIGURE 5, the high frequency-detector 23 comprises the respective transistors $Q_{1a}$ and $Q_{2a}$, with the winding 32 of relay 25 connected across the emitter resistor 96 of the output transistor $Q_{2a}$. The input circuitry up to the coupling condenser 97 leading to the base of transistor $Q_{2a}$ is similar to that of the low frequency-detector circuit 22 except that the Zener diode 98 connected between supply wire 99 and ground wire 100 is designed to limit the supply voltage across wires 99 and 100 to 9.1 volts. Thus, the high frequency-regulator or detector 23 is provided with the input terminals 101, 102 and 103, the terminal 103 being connected to the ground wire 100 and the terminal 101 being connected to the supply wire 99 through a resistor 104. The wire 72 is connected to terminal 103, which is thus connected to stationary contact 43 of the double-pole, double-throw switch 40. With pole 41 engaging contact 43, wire 100 is grounded, similar to wire 81.

Terminal 101 is connected to wire 47, and thus to switch contacts 42, whereby terminal 101 is connected to the ungrounded battery wire when ignition switch 37 is closed, with pole 39 engaging contacts 42. Terminal 102 is connected to wire 74, and hence to the wire 75 leading to the ungrounded ignition breaker points. The ignition pulses are thus conveyed to the base of transistor $Q_{1a}$ through a condenser 105 and a resistor 106 in the same manner as in the input circuit of the low frequency-detector 22.

The collector of transistor $Q_{1a}$ is connected to wire 99 through a resistor 107. The collector of said transistor $Q_{1a}$ is likewise connected to the base of transistor $Q_{2a}$ through the coupling condenser 97 and a diode 108. A diode 109 is connected across the junction between condenser 97 and diode 108 and the ground wire 100, acting to short-out negative-going pulses to ground, whereas the positive pulses flow through the diode 108 to the base of transistor $Q_{2a}$. A condenser 110 is connected between the base wire 111 and the ground wire 100, acting as a filter to smooth out the pulses delivered to the base of transistor $Q_{2a}$. A variable resistor 112 is connected across wires 111 and 100 and is employed to adjust the bias on the base of transistor $Q_{2a}$, which regulates the frequency at which relay 25 will trigger. Thus, the voltage at the emitter of transistor $Q_{2a}$ is proportional to the frequency of the pulses delivered by terminal 102. The relay 25 can, therefore, be set to operate, by adjustment of the variable resistor device 112, at a predetermined pulse frequency, corresponding to a predetermined vehicle speed.

The automatic speed-control device is placed in operation by operating switch 40 to cause poles 39 and 41 to respectively engage contacts 42 and 43, with switch 54 set so that its poles 53 and 55 respectively engage contacts 56 and 57. With the ignition switch 37 closed, the solenoid winding 16 of valve 15 will then be energized by a circuit comprising battery terminal 35, switch 37, wire 38, pole 39, contacts 42, wire 47, relay contacts 26, 27, wire 48, fuse 49, wire 51, switch contacts 53, 56, wire 60, the timer contacts elements 64, 63, 65, wire 68, relay contacts 29, 30, wire 17, the solenoid winding 16, and ground.

It will be noted that with the ignition switch off, the relay 24 will be in its normal condition, namely, with the pole 26 engaging the contact 27. When the ignition switch 37 is closed, the relay 24 becomes energized, since there are no pulses applied to the terminal 70. However, when the engine is cranked, the pulses are applied to terminal 70 and relay 24 becomes de-energized in the manner above-described, allowing pole 26 to engage contact 27 and complete the circuit required to energize solenoid 16. This feature prevents defeat of the device by preventing wire switching at the input, and, therefore, insures proper functioning of the high threshold-detector, namely, the high frequency-detection section 23 of the apparatus.

When the speed threshold determined by the setting of the variable resistor device 112 is reached, relay winding 32 becomes energized and relay 25 switches its pole 29 from contact 30 to contact 31. The energizing circuit for valve solenoid 16 is thus opened, and at the same time, the signal lamp 33 becomes de-energized. When pole 29 engages contact 31, a short circuit is created, causing fuse 49 to blow. To obtain additional fuel, switch 54 must be operated to re-energize the valve solenoid 16, namely, must be operated to move poles 53 and 55 respectively into engagement with contacts 58 and 59. This re-establishes the circuit required to energize valve solenoid 16 by inserting a branch containing the fuse 50 in circuit between wires 60 and 48, namely, the branch comprising contacts 59, pole 55, wire 52, and fuse 50. This branch replaces the former branch which contains the fuse 49. This operation of switch 54 also energizes the timer motor 62 through a circuit comprising supply wire 48, fuse 50, wire 52, pole 55 contact 59, wire 60, wire 67, the winding of the timer motor 62, wire 51, pole 53, contacts 58 and ground. At the end of the timed period required to open the circuit between brushes 64 and 65, which may be of the order of a half-hour, the valve solenoid 16 will again become deenergized, shutting the valve 15 and cutting off any further supply of fuel to the engine. If, during this timed period, the threshold speed should be again reached, relay pole 29 switches from contact 30 to contact 31, again opening the circuit to the valve solenoid 16 and again creating a short circuit, this time through the fuse 50, which blows, preventing any further re-energization of the valve solenoid 16. The apparatus is arranged so that all the switches and fuses, with the exception of the switch 54, are inaccessible within a locked control box, as shown diagrammatically in dotted view at 113. Thus, in the absence of the key to said control box, the fuel supply cannot be resumed, nor can the fuses 49 and 50 be replaced and the timer re-set. Also, access is, of course, prevented to the main reversing switch 40.

Suitable circuit breakers with manual re-set buttons can be used in place of the fuses 49 and 50, provided they are fast-acting. The wire 17 is preferably enclosed in a suitable armored sheath or casing 113' to render it tamperproof.

As shown in FIGURE 6, to reduce the possibility of unauthorized operation of the solenoid valve 16, the valve may be of a type which is operated by an alternating voltage considerably different from the battery supply voltage of the vehicle, for example, by 24 volts alternating current. Thus, an alternating current inverter 114 is employed to supply the required voltage to the valve solenoid 16, the inverter 114 being operated from the vehicle storage battery. Thus, as shown in FIGURE 6, the wire 46 is connected to the ungrounded input terminal 115 of the inverter 114, the remaining input terminal 116 being grounded, as shown.

Since the input terminal 115 of the inverter replaces the wire 17 of FIGURE 1, the solenoid valve will be operated responsive to the energization of input terminal 115 in the same manner as the solenoid valve 15 is operated in the embodiment shown in FIGURE 1. Thus, when the wire 68 is connected to the battery wire 47 in the manner described in connection with FIGURE 1, the solenoid valve will be energized, allowing fuel to be supplied to the engine. Since the solenoid valve cannot be energized except by furnishing 24 volts alternating current thereto, it is not possible to open the valve by connecting the vehicle battery thereto.

FIGURE 7 illustrates a further embodiment of the invention wherein an alternating current-operated relay is employed to control the supply of current to the valve solenoid 16 and wherein an alternating current inverter 114′ is provided to energize the relay, the relay being controlled in the same manner as the wire 17 in the embodiment of FIGURE 1. Thus, as in the embodiment of the invention of FIGURE 6, the wire 46 is connected to the ungrounded input terminal of the 6 volt alternating current inverter 114′, the remaining input terminal of the inverter, shown at 116, being grounded. The output wires 117, 118 of the inverter carry 6 volts alternating current, said wires 117, 118 being connected to the respective terminals of the winding of the relay, shown at 119. The wire 17′, which is connected to the wire 46, as shown in FIGURE 7, is connected to the stationary contact 120 of relay 119, and the pole 121 of the relay is connected to the ungrounded input terminal of the valve solenoid 16. Therefore, it is necessary to energize the relay 119 in order to provide energization of solenoid 16 and to thereby open valve 15. This requires that the inverter 114′ be energized in order to open valve 15. Therefore, it is not possible to open valve 15 by merely connecting the wires 117, 118 across the vehicle battery. Since the relay 119 is a relatively delicate alternating current relay which is designed to operate at low A.C. voltage, such an attempt to circumvent the apparatus would result in damage to the relay, requiring repair.

FIGURE 8 illustrates another modification of the system of FIGURE 1 wherein the high frequency-responsive relay, shown at 25′, is provided with an extra pole 122 engageable with a fixed contact 123 responsive to the energization of the relay. The relay winding, shown at 32′, is connected across the wires 124 and 100, which are the output wires of the high frequency-detector or regulator circuit of FIGURE 5. Wire 124 is connected through a resistor 126 to the relay contact 123, and said relay contact 123 is connected, in turn, by a wire 127 to the ungrounded terminal of a suitable warning device, such as a red signal lamp, a buzzer, or the like. The double-throw, fuse-changing switch, shown at 54′ is also provided with an extra pole, shown at 129, engageable either with a stationary contact 130 or a stationary contact 131, depending upon the closed positions of the main poles 53 and 55. The contacts 130 and 131 are both connected to a common wire 132 which is, in turn, connected to the relay pole 122. Thus, when the high speed-responsive relay 25′ is energized, the warning system is simultaneously energized both from the output of the detector or regulator stage 23 and through a circuit comprising the battery wire 48, a wire 133 connecting wire 48 to pole 129, the stationary contact 130, the wire 132, the relay contacts 122, 123 and the wire 127. The warning signal is, therefore, given as long as relay 25′ remains energized, even after switch 54′ has been operated to swing its poles from their left-hand contact positions to their right-hand contact positions in FIGURE 8. It will be seen from FIGURE 8 that the relay 25′ will latch closed upon the closure of its contacts 122, 123 by a circuit comprising wire 48, wire 133, pole 129, contact 130, wire 132, pole 122, contact 123, resistor 126, the winding 32′ of the relay and the grounded wire 100. This will maintain the warning device energized until the switch 54′ is operated to place the second fuse 50 in the circuit to replace the blown fuse 49. Upon actuation of switch 54′, the relay 25′ is released by the disengagement of pole 129 from contact 130. However, the relay can be again operated and latched with the switch 54′, in its right-hand closed position responsive to excessive speed of the vehicle in the manner above-described, which will again deenergize the solenoid valve and cause energization of the warning device, as well as causing the second fuse 50 to blow in the manner above-described.

As mentioned previously, sufficient fuel capacity is provided in the conduit 18, the fitting 19, and the passage 20 to allow for necessary acceleration of the vehicle in an emergency situation for a short period of time after the first fuse 49 blows. Thus, in the event of such an emergency requiring substantial or high speed of the vehicle, the fuse 49 will blow, but the operator will have sufficient fuel to control the vehicle for the duration of the emergency. Thereafter, the operator may throw the switch 54 or 54′ to its second position, which initiates the operation of the timer 61 and which allows the operator to proceed at a moderate speed for the duration of the time allowed by the timer 61, as above-described. This period of time will, under ordinary conditions, be sufficient to allow the operator to return home or to reach a location from which he can telephone for the necessary assistance.

While certain specific embodiments of a speed-control system for motor vehicles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle having an internal combustion engine, a speed-control system comprising electromagnetic control means, means for maintaining the engine in a normal operating state when said control means is energized, a source of current, an energizing circuit connecting said source to said control means, said energizing circuit including a first branch containing a first overload-responsive circuit-breaking device, a second branch containing a second overload-responsive circuit-breaking device, and selector switch means to at times switch said second branch into said energizing circuit in place of said first branch, means to overload said first circuit-breaking device and to cause it to open responsive to an increase in speed of said engine beyond a predetermined value, whereby to de-energize said electromagnetic control means a first time and whereby said control means can be re-energized by operating the selector switch means to switch the second branch into said energizing circuit, and means to overload said second overload-responsive circuit-breaking device and cause it to open responsive to another increase in speed of said engine beyond said predetermined value.

2. The speed-control system of claim 1, and means to open said energizing circuits after a predetermined period of time responsive to the operation of said selector switch means.

3. The speed-control system of claim 2, and wherein the last-named means to open said energizing circuit comprises a normally closed timed switch connected in said energizing circuit and opening after it has been energized for said predetermined period of time, and means to energize said timed switch responsive to said operation of the selector switch means.

4. The speed-control system of claim 3, and wherein said timed switch is provided with an operating winding, circuit means short-circuiting said operating winding in the normal position of said selector switch means, and wherein the means to energize said timed switch comprises circuit means to connect said operating winding to said source of current responsive to said operation of the selector switch means.

5. The speed-control system of claim 4, and means to maintain the energizing circuit open during the cranking period of the engine.

6. The speed-control system of claim 5, and wherein said means to maintain the energizing circuit open comprises relay means having normally closed contacts connected in said energizing circuit, means to energize said relay means responsive to the cranking of the engine upon starting thereof, whereby to open said contacts, and means to de-energize said relay means responsive to the increase in speed resulting from the firing of the engine.

7. The speed-control system of claim 1, and wherein said means to overload said circuit-breaking devices comprises a short-circuiting branch circuit, and means responsive to the engine speed to substitute said short-circuiting branch circuit for said electromagnetic control means in said energizing circuit.

8. The speed-control system of claim 7, and wherein one side of the electromagnetic control means is grounded and said short-circuiting branch comprises a connection to ground.

9. The speed-control system of claim 8, and wherein said means to substitute the short-circuiting branch for the electromagnetic control means comprises normally de-energized relay means having a pole connected to said energizing circuit and a pair of stationary contacts, one stationary contact being grounded and the other stationary contacts being connected to the ungrounded side of the electromagnetic control means, said pole normally engaging said other stationary contact and moving into engagement with said grounded one stationary contact responsive to the energization of the relay means, and speed-detection means connected between the ignition circuit of the engine and said relay means and energizing said relay means responsive to said increase in speed of the engine.

10. The speed-control system of claim 6, and wherein said means to overload said circuit-breaking devices comprising a short-circuiting branch circuit and means responsive to the engine speed to substitute said short-circuiting branch circuit for said electromagnetic control means in said energizing circuit, said last-named means comprising normally de-energized second relay means having a pole connected to the energizing circuit and a pair of stationary contacts, one stationary contact being connected to said short-circuiting branch circuit and the other stationary contact being connected to the electromagnetic control means, said pole normally engaging said other stationary contact and moving into engagement with said one stationary contact responsive to the energization of said second relay means, and speed-detection means connected between the ignition circuit of the engine and said second relay means and energizing said second relay means responsive to said increase in speed of the engine beyond said predetermined value.

References Cited
UNITED STATES PATENTS

| | | |
|---|---|---|
| 2,131,264 | 9/1938 | Benjamin. |
| 3,249,098 | 5/1966 | Rosenberg _____ 123—102 |
| 3,153,746 | 10/1964 | Atkinson _____ 180—32.1 XR |

WENDELL E. BURNS, *Primary Examiner.*